United States Patent
Rathi et al.

(10) Patent No.: US 10,496,486 B1
(45) Date of Patent: Dec. 3, 2019

(54) PROTECTING DATA INTEGRITY IN A MULTIPLE PATH INPUT/OUTPUT ENVIRONMENT

(71) Applicant: International Business Machines Corporation, Armonk, NY (US)

(72) Inventors: Sanket Rathi, Hyderabad (IN); Purna Chandra R. Jasti, Hyderabad (IN); James P. Allen, Austin, TX (US); Gary S. Domrow, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/022,930

(22) Filed: Jun. 29, 2018

(51) Int. Cl.
*G06F 11/14* (2006.01)
*G06F 11/20* (2006.01)
*G06F 3/06* (2006.01)

(52) U.S. Cl.
CPC .......... *G06F 11/1443* (2013.01); *G06F 3/065* (2013.01); *G06F 3/067* (2013.01); *G06F 3/0619* (2013.01); *G06F 3/0635* (2013.01); *G06F 3/0659* (2013.01); *G06F 11/1441* (2013.01); *G06F 11/2033* (2013.01)

(58) Field of Classification Search
CPC ............. G06F 2201/815; G06F 11/201; H04L 67/1097; H04L 45/24
USPC ............................................ 710/38; 370/225
See application file for complete search history.

(56) References Cited

U.S. PATENT DOCUMENTS

| | | | |
|---|---|---|---|
| 6,157,962 A | 12/2000 | Hodges et al. | |
| 7,076,573 B2* | 7/2006 | Allen | G06F 11/0727 709/223 |
| 8,041,987 B2* | 10/2011 | Allen | G06F 11/2005 714/4.11 |
| 8,341,308 B2* | 12/2012 | Allen | H04L 47/10 710/15 |
| 8,713,362 B2 | 4/2014 | Griffith et al. | |
| 8,745,448 B2* | 6/2014 | Koga | G06F 11/0751 714/4.1 |
| 8,949,656 B1* | 2/2015 | Ninan | G06F 11/2005 714/4.1 |
| 9,172,600 B1* | 10/2015 | Vora | H04L 41/0659 |
| 9,461,867 B1* | 10/2016 | Atia | H04L 45/24 |
| 9,495,119 B1* | 11/2016 | Gong | G06F 3/0689 |
| 10,177,968 B2* | 1/2019 | Domrow | H04L 41/0668 |
| 2009/0187645 A1 | 7/2009 | Hayden et al. | |
| 2012/0144233 A1* | 6/2012 | Griffith | G06F 11/1443 714/13 |
| 2013/0007410 A1 | 1/2013 | Kopylovitz et al. | |

(Continued)

*Primary Examiner* — Brian T Misiura
(74) *Attorney, Agent, or Firm* — Patterson + Sheridan, LLP

(57) ABSTRACT

Methods and apparatuses for protecting data integrity in a multiple path input/output environment are provided. When sending a write command that includes data to be written to a target device from an initiator device over a specified first path of a plurality of paths by which the target device is in communication with the initiator device when a fault in the first path is detected and the status of the write command indicates that the write command was fully transmitted to the target device, a second path of a plurality of paths is selected, a reset command is sent over the second path from the initiator device to the target device, and after sending the reset command, the data are retransmitted in a second write command that a path other than the first path from the initiator device to the target device.

17 Claims, 5 Drawing Sheets

(56) References Cited

U.S. PATENT DOCUMENTS

2018/0157429 A1\* 6/2018 Venkat ................. G06F 3/0689
2018/0234290 A1\* 8/2018 Domrow ................ H04L 45/00

\* cited by examiner

PROTECTING DATA INTEGRITY IN A MULTIPLE PATH INPUT/OUTPUT ENVIRONMENT

BACKGROUND

The present disclosure relates to multi-path input/output environments in computing devices, and more specifically, to systems and methods that protect data integrity in the event of a transmission fault.

SUMMARY

According to a first embodiment of the present disclosure, a method is provided for protecting data integrity in a multiple path input/output environment, comprising: passing a write command that includes data to be written to a target device from a command layer within an initiator device to a transmission layer within the initiator device; specifying, via the transmission layer, the write command to be sent over a first path of a plurality of paths by which the target device is in communication with the initiator device as a physical transport layer between the target device and the initiator device; sending, via the transmission layer, the write command over the first path from the initiator device to the target device; detecting a fault in the first path; notifying, by the transmission layer, the command layer of the fault in the first path; in response to detecting the fault in the first path: determining a status of the write command; in response to determining a status of the write command as fully transmitted: passing a reset command for the target device from the command layer to the transmission layer; selecting, via the command layer, a second path of a plurality of paths other than the first path; sending, via the transmission layer, the reset command over the second path from the initiator device to the target device; passing a second write command that includes the data to be written to the target device from the command layer to the transmission layer; selecting, via the command layer, a different path of a plurality of paths other than the first path; and sending, via the transmission layer, the second write command over the different path from the initiator device to the target device.

According to a second embodiment of the present disclosure, a system is provided for protecting data integrity in a multiple path input/output environment, the system comprising: a processor and a memory storage device including instructions that when executed by the processor enable the system to: pass a write command that includes data to be written to a target device from a command layer within an initiator device to a transmission layer within the initiator device; specify, via the transmission layer, the write command to be sent over a first path of a plurality of paths by which the target device is in communication with the initiator device as a physical transport layer between the target device and the initiator device; send, via the transmission layer, the write command over the first path from the initiator device to the target device; detect a fault in the first path; notify, by the transmission layer, the command layer of the fault in the first path; in response to detecting the fault in the first path: determine a status of the write command; in response to determining a status of the write command as fully transmitted: pass a reset command for the target device from the command layer to the transmission layer; select, via the command layer, a second path of a plurality of paths for the reset command to be sent over; send, via the transmission layer, the reset command over the second path from the initiator device to the target device; pass a second write command that includes the data to be written to the target device from the command layer to the transmission layer; specify, via the transmission layer, the second write command to be sent over a different path of a plurality of paths than the first path; and send, via the transmission layer, the second write command over the different path from the initiator device to the target device.

According to a third embodiment of the present disclosure, a computer program product is provided for protecting data integrity in a multi-path input/output environment, the computer program product comprising: a computer-readable storage medium having computer-readable program code embodied therewith, the computer-readable program code executable by one or more computer processors to: generate a write command that includes data to be written to a target device from an initiator device; specify a first path of a plurality of paths by which the target device is in communication with the initiator device; send the write command over the first path from the initiator device to the target device; detect a fault in the first path; in response to detecting the fault in the first path and identifying a status of the write command as fully transmitted: select a second path of a plurality of paths by which the target device is in communication with the initiator device; send a reset command over the second path from the initiator device to the target device; and after sending the reset command, send a second write command that includes the data over the second path from the initiator device to the target device.

DETAILED DESCRIPTION

Figure 1:
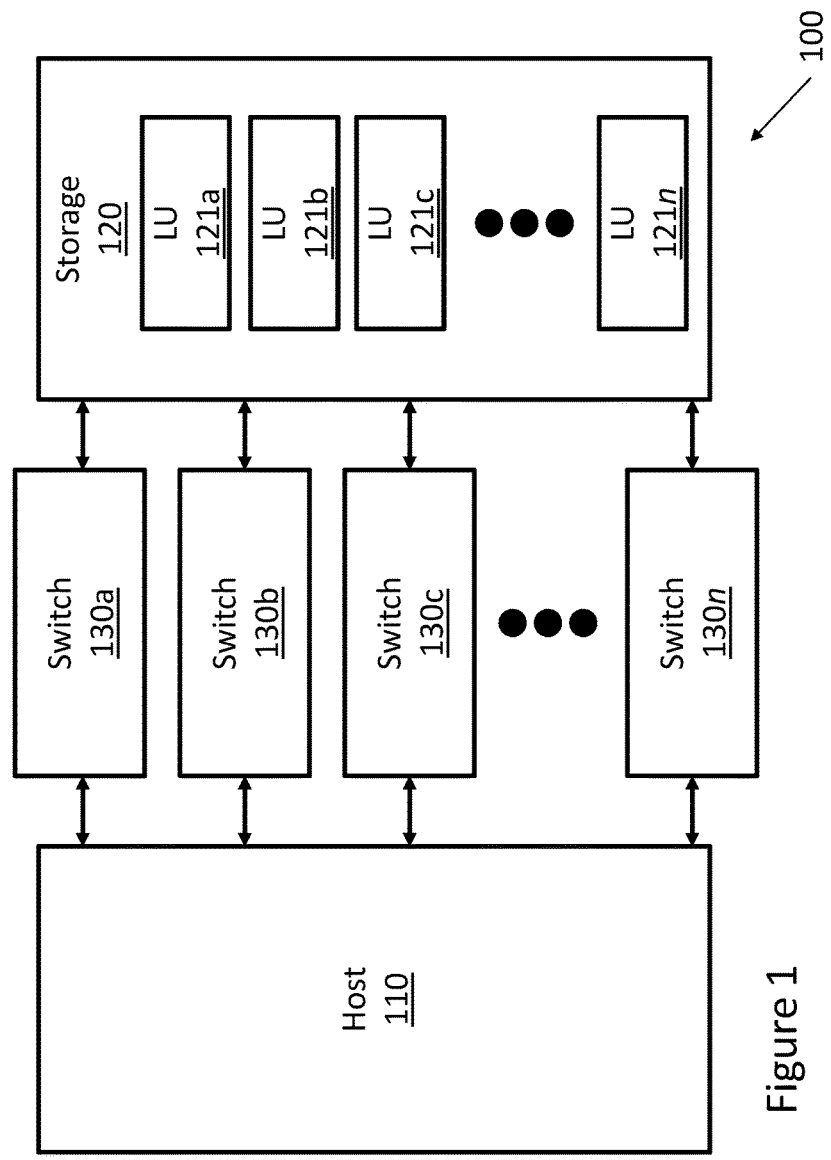
FIG. 1 illustrates an example multiple path input/output environment according to aspects of the present disclosure.

In a computer, various devices that make up the computer may issue commands to one another to implement various functions associated with software or hardware control of the computer. For example, a command to read or write data to a hard disk drive (or another memory storage device) may be issued by a driver or adapter on behalf of another device or a an active piece of software. A multi-path environment may include multiple parallel paths from a command issuer (an "initiator device") to a command recipient (a "target device") over which a command may travel, which poses several issues in how to handle faults in transmission of the commands. Transmission faults are a type of *Byzantine* fault in which two or more communicating systems have incomplete information on whether a transmission has been successfully received and whether the other systems know that the transmission was successfully or unsuccessfully received. A command that faults in transmission may result in an execution error if the fault is not identified and handled.

Handling a transmission fault may include issuing a reset command to a target device via one or more of the parallel paths so that the faulted command (i.e., the command affected by a fault) does not execute, or does not execute out of a desired command order. Reset commands, however, are disruptive; resets use available bandwidth that could be allocated to other commands, and the commands affected by the resets may need to be resent in a desired order of execution. A reset command may delete queued commands from a register on a target device and allow the target device to release any reservations for spaces in its memory associated with the queued commands.

The present disclosure provides systems and methods that minimize the impact of reset commands and reduce the amount of reset commands issued in a computer. The initiator device and the target device use the multiple paths to share knowledge of transmission faults that affect valid commands to control how or what data are stored on the target device (termed write commands), and commands that are invalid or that do not control how or what data are stored on the target device (termed read commands) are handled without needing to share knowledge of a transmission fault; thus reducing the bandwidth consumed by the system and reducing the number of reset commands issued by the initiator device.

In the current disclosure, several commands will be discussed in the provided examples with the format of a letter representing the command type, a number representing an intended order of execution, and a letter indicating a pathway by which the command is sent from an initiator device to a target device. For example, command W1$a$ would be a write (W) command intended for first (1) execution that is sent over path$_a$ (a), command R2$b$ would be a read (R) command intended for second (2) execution that is sent over path$_b$ (b), and command Cxn would be a command (C) of indeterminate type intended for execution at an indeterminate time (x) that is sent over an indeterminate path$_n$ (n) of the multiple available paths. As used herein, a "write" command is any command that affects what data are written to the target device, which may include write commands specifying specific data to store at specific addresses on the target device, erase commands that specify certain addresses are to be overwritten, and the like. Any command that does not affect what data are written to the target device may be referred to herein as a "read" command or a "non-write" command.

To illustrate, consider a first command sent via path$_a$ (termed C1$a$), a re-transmittal of the first command sent over a path$_b$ (termed C1$b$) and a second command sent over a different path than path$_a$ (termed C2$n$). When the target device has received command C1$a$, the target device will attempt to send a response or other status message to the initiator device before executing command C1$a$ to inform the initiator device that the target device has successfully received the command (as is specified in several standards, such as with a response in a Small Computer System Interface (SCSI) standard). If a transmission fault occurs on path$_a$ at this time, the initiator device may not know that the target device has received command C1$a$, and may retransmit the command over path$_b$ (as C1$b$) to avoid a transmission fault inherent to path$_a$. Additionally or instead of retransmitting the command C1$a$ as C1$b$, the initiator may transmit command C2$n$ in the time period after a transmission fault has occurred and the target device is waiting to execute the original command C1$a$. Depending on the types of commands received, either of command C1$b$ or command C2$n$ may be disrupted by the execution of command C1$a$, and in turn may disrupt the execution of command C1$a$, and thereby disrupt the order in which data are written to the addressed logical unit of the target device.

The target device therefore identifies when command C1$a$ is a valid write command that has been received during a transmission fault, and in response transmits a response to the initiator device and holds any write commands currently in queue. The initiator device, in response to receiving this information may issue a reset command to the target device over a path that is not experiencing a transmission fault so that the conflicting commands may be cleared (and may later be resent over non-faulty paths). If the command C1$a$ in the above example is not valid, or is not a write command, the target device may handle command C1$a$ without notifying the initiator device (e.g., deleting/ignoring an invalid command, executing a read command), thus reducing the bandwidth consumed by the system and reducing the number of reset commands issued by the initiator device (and the retransmission of any commands affected by reset commands).

With reference now to FIG. 1, an example multiple path input/output environment 100 according to aspects of the present disclosure is illustrated. The environment 100 may be implemented in an individual computing device or several computing devices arranged in a distributed or networked system. The environment includes a host 110, which issues commands to targeted storage 120 via a plurality of paths established via switches 130$a$-$n$ (generally, switch 130).

The host 110 is a physical computing component that connects one or more devices with the storage 120 and/or interfaces with one or more computer programs (e.g., via a driver or adapter) to read data from or write data to the storage 120. The host 110 is an initiator device that manages what data are sent to and retrieved from the storage 120 (e.g., via commands to read from or write data to particular addresses in the storage) and what paths the data are sent on. In one example, the host 110 selects one path of a plurality of paths to carry data for a given task, and uses other paths of the plurality of paths for other tasks to execute one or more tasks in parallel. In another example, using a plurality of paths, the host 110 may rotate portions of a given task through several paths in a round robin to increase throughput for the data from the host 110 to the storage 120 relative to a single path throughput. In some embodiments, the host 110 may be a SCSI host adapter, but may also be a device formatted to control data transmission in a multi-path environment according to other standards.

Within the environment, the host 110 may include an Operation System (OS) or other computer program, a Multi-Path Input/Output (MPIO) driver, and a host bus adapter (HBA). The OS or other computing program may request that certain commands be executed on local or network storage devices, such as write commands or read commands. The MPIO driver translates these commands from the format used by the OS/program to the hardware standard used by the HBA and storage devices. In some embodiments, a command from the OS/program may be separated into several commands by the MPIO driver for execution in a particular order. Once translated, the HBA transmits the command (or commands) to a designated storage device. The HBA handles any responses (e.g., command received, confirm execution) related to the execution of the command(s), and receives any requested data back from the storage device, which the MPIO driver in turn translates from the hardware standard back to the format expected by the OS/program for transmission thereto.

The storage 120 may be one or more memory storage devices (e.g., hard disks, tape drives) that are addressable by the host 110, and may be a single device or part of a Storage Area Network (SAN). The storage 120 includes a plurality of Logical Units (LU) 121a-n (generally, LU 121) that are individual devices or virtual devices (e.g., a partition of a physical storage device) that support read and write operations to store/retrieve data thereon. The plurality of LU 121 included in the storage 120 may be of one type or of several types, and each LU 121 is individually addressable to write to or read from via a Logical Unit Number (LUN) and addressable within a given LU 121 by a Logical Block Addressing (LBA) scheme or similar addressing scheme.

The switches 130 include the cabling and hardware that define one or more electrical or optical paths by which data may be transmitted between the host 110 and the storage 120. Although the illustrated example shows n switches 130 that establish n paths between individual ports on the host 110 and the storage 120, in other examples, a switch 130 may be connected to multiple ports on one or more of the host 110 and the storage 120 to define several paths between the host 110 and the storage 120. In embodiments with switches 130 that provide 1:1 links between the host 110 and the storage 120, each path (also referred to as a link or pathway) may be referred to based on the associated switch 130 (e.g., switch 130a provides $path_a$ whereas switch 130n provides $path_n$). In various embodiments, the switches 130 receive signals from the host 110 and the storage 120 and determine when to forward the signals to the other device (i.e., the storage 120 or the host 110) so that the signals do not collide or interfere with other signals on the transmission medium managed by the switch 130.

Figure 2:
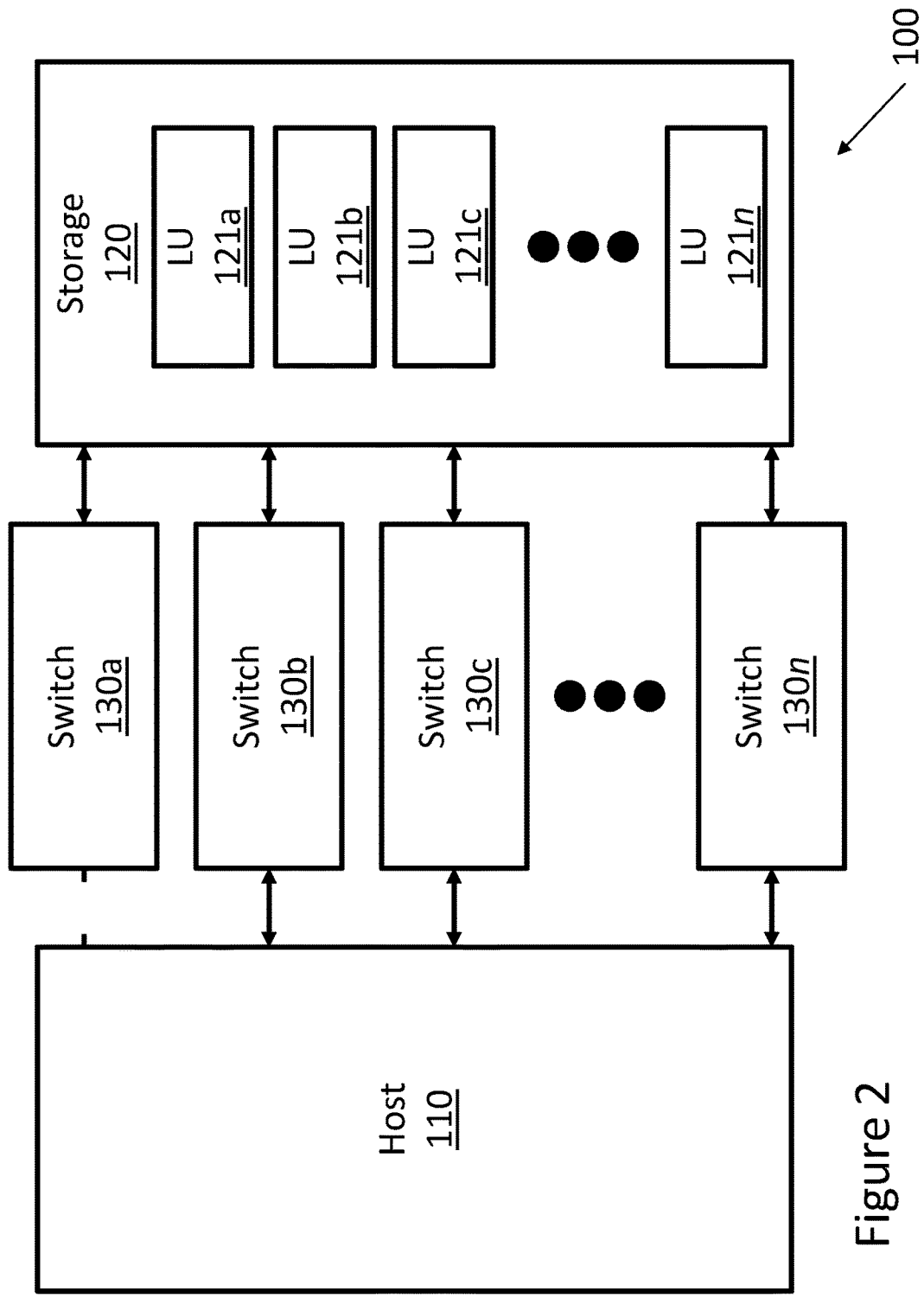
FIG. 2 illustrates an example multiple path input/output environment with a write fault according to aspects of the present disclosure.

FIG. 2 illustrates an example multiple path input/output environment with a transmission fault according to aspects of the present disclosure. The example transmission fault is illustrated as a connection fault (occurring in $path_a$ associated with switch 130a), but transmission faults may also occur due to improper generation of a command by the host 110, improper reading of a command at the storage 120, interference generated on the switch 130, or the like.

In some embodiments, the transmission fault is identified at the host 110. In one example, the host 110 may issue the command over $path_a$ and wait for a response from the storage 120 that indicates that the command has been received. If a response is not received over $path_a$ indicating that the initial command was successfully received within a predetermined time, the host 110 determines a transmission fault has occurred over $path_a$, and may attempt to resend the command over $path_a$ or a different path (e.g., $path_b$). In a second example, a switch 130 may transmit a "good connection" signal to the host 110, and when the host 110 stops receiving a "good connection" signal, the host 110 identifies that a transmission fault has occurred. In a third example, the host 110 may receive a response from the storage 120 with a checksum or other error checking component that does not match the expected value at the host 110, which signals the host 110 that a fault has occurred.

In other embodiments, the transmission fault is identified at the storage 120. In one example, the host 110 may issue the command during specific time windows, and if a command is not received in a corresponding time window (i.e., a command is missed), the storage 120 may determine that a transmission fault occurred in the path associated with the time window. In a second example, a command issued by the host 110 may include a checksum or be of a designated length in bits, and the storage 120 determines that a transmission fault has occurred when a received command fails checksum of has an improper amount of bits. In a third example, the storage 120 determines that a transmission fault has occurred in a given path in response to receiving a command but not receiving a "transmission complete" signal from the host 110 within a determined amount of time. In a fourth example, a switch 130 may transmit a "good connection" or "non-faulty" signal to the storage 110, and when the storage 120 stops receiving a "good connection" signal, the storage 120 identifies that a transmission fault has occurred.

One or both of the host 110 and the storage 120 may determine that a transmission fault has occurred and communicate the fault to the other device, albeit via a separate path than the path determined to be experiencing a transmission fault.

Depending on the type of transmission fault identified and the type of command affected by the transmission fault, the host 110 and the storage 120 may take different responses according to the present disclosure to mitigate the need to issue reset commands according to the present disclosure. For example, a read command will not affect the integrity of the data in the storage 120, and may be safely executed out of sequence. In another example, incomplete or corrupted commands (generally, "invalid" or "not valid") may be identified as such by the storage 120 and deleted or ignored by the storage 120 without need for a reset command to be generated.

Figure 3:
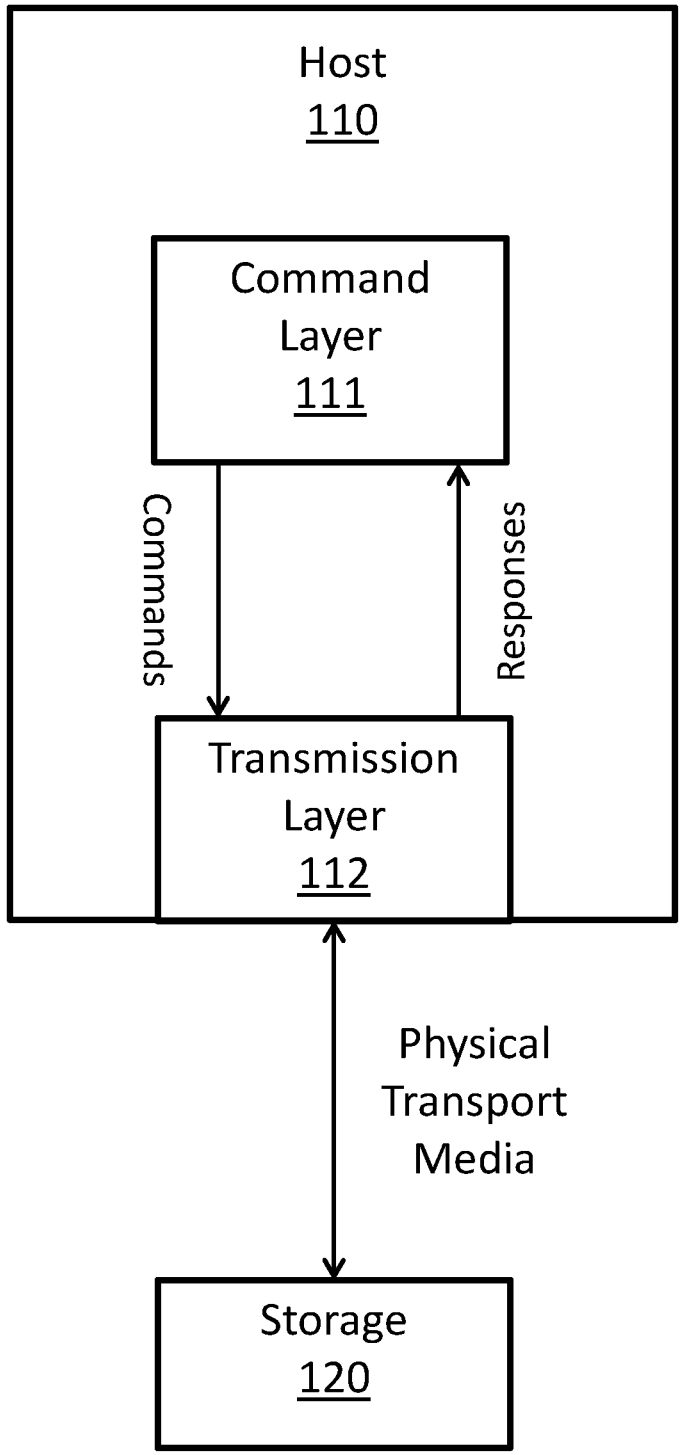
FIG. 3 illustrates an example communications block diagram according to aspects of the present disclosure.

FIG. 3 illustrates an example communications block diagram according to aspects of the present disclosure. In various embodiments, functions within the host 110 for maintaining data integrity on the storage 120 may be divided into a command layer 111 and a transmission layer 112.

The command layer 111 represents a software controller for managing the commands sent to and received from the storage 120 for the host 110. The command layer 111 may interact with the various programs and adapters running on the host 110 to determine an order and a format for the commands. In some embodiments, the host 110 determines which path a given command is to be transmitted over, and may track whether a confirmation response for a given command has been received from the storage 120 (e.g., indicating that the storage 120 has completed the given command). The command layer 111 may determine that a transmission fault has occurred when a confirmation response has not been received for a given command within a predefined time window (e.g., a time out occurs) or when a determination is passed to the command layer 111 from the transmission layer 112.

The transmission layer 112 represents a combined software and hardware controller for the transmission of signals from the host 110 to the storage 120. Depending on the physical transmission medium used between the host 110 and the storage 120 (which may include the switches 130), the transmission layer 112 may control and/or monitor various optical and electrical devices for placing signals onto the transmission medium or for receiving signals over the transmission medium. For example, various lasers and photodiodes may be controlled by the transmission layer to operate on a fiber optic transmission medium between the host 110 and the storage 120, where each fiber optic cable provides an individual path in the multiple path input/output environment. The transmission layer 112 may also control various electrical devices for communicating over electrically conductive transmission media. In various embodiments, the transmission layer 112 may determine that a transmission fault over a given path has occurred when a hardware error on the host 110 or a loss of connectivity (e.g., signals from the storage cease) is detected. The transmission layer 112 may pass this determination of a transmission fault to the command layer 111 for handling according to various embodiments described in the present disclosure.

Figure 4:
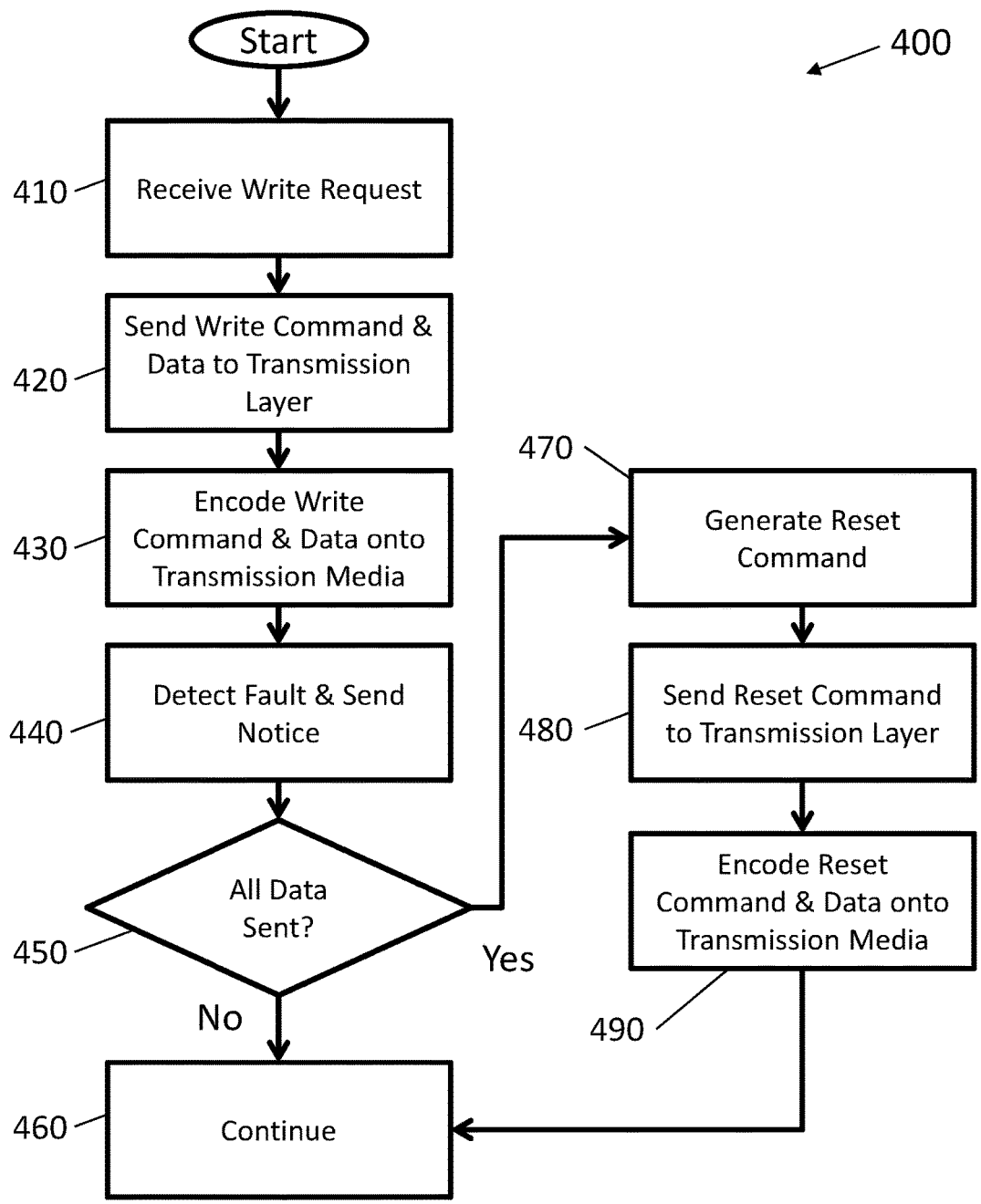
FIG. 4 is a flowchart that shows general operations of an example method for protecting data integrity in a multiple path input/output environment according to aspects of the present disclosure.

FIG. 4 is a flowchart that shows general operations of an example method 400 for protecting data integrity in a multiple path input/output environment. Method 400 begins with block 410, where the command layer 111 generates a write command and identifies data to write to a target device (e.g., a given LU 121 of the storage 120). The command layer 111 may generate the write command in response to a request an adapter or program running on the host device 110, or may generate a write command in response to a response received from the transmission layer 112. The data may be identified in one or more registers or memory storage accessible to the command layer 111. As part of generating the write command, the command layer 111 may determine one path of a plurality of paths for the write command to be transmitted to the target device. For example, the command layer 111 may specify that the write command is to be sent over a first path (a second path, an nth path) of a plurality of paths by which the host device 110 and the storage device 120 are in communication in the multiple path input/output environment.

At block 420, the command layer 111 passes the write command and the data to the transmission layer 112. In various embodiments, the command layer 111 formats and splits the data into several commands. For example, the data may be encapsulated as a payload for a command and a checksum may be generated for the command. In another example, the command layer 111 generates a first write command including a first portion of the data and a second write command including a second portion of the command layer 111 passes to the transmission layer 112 for completion on the target device in order. The command layer 111 may specify the LU 121 to which the data are to be written, the path over which the data are to be transmitted.

At block 430, the transmission layer 112 encodes the write command (and the included data) onto a specified path of the transmission medium linking the initiator device and the target device.

At block 440, a fault in transmission over the specified path for the write command is detected, and the command layer 111 is given notice of the transmission fault. In various embodiments, the transmission layer 112 detects a fault in the path and notifies the command layer 111 via an alert message that a transmission fault has been detected In other embodiments, the command layer 111 is given notice when a completion response for the command is not received from the transmission layer within a predetermined amount of time from when the command was sent (i.e., the response times out).

At block 450, the command layer 111 determines whether the write command was fully or partially transmitted at the time of the detected transmission fault. The command layer 111 may pass the write command to the transmission layer 112 (per block 420) as a packet or a stream of bits for sequential transmission, which may affect how the command layer 111 determines whether the write command was fully or partially transmitted. When the command layer 111 passes the command as a packet to the transmission layer 112, the transmission layer 112 may track how many bits of a packet for the write command have been fully transmitted when a transmission fault is detected, and notify the command layer 111 whether transmission was complete or incomplete. When a bitwise streaming transfer of the write command is used, the command layer 111 may track whether the command has been fully transmitted to the transmission layer when a transmission fault is detected to determine whether the write command was fully or partially transmitted at the time the transmission fault was detected. In response to determining that the write command was not fully transmitted at the time the transmission fault was detected, method 400 proceeds to block 460. In response to determining that the write command was fully transmitted at the time the transmission fault was detected, method 400 proceeds to block 470.

At block 460, the target device continues operation, including attempting to resend the write command over a different path than was originally used to transmit the write command. The command layer 111 passes a second write command that includes the data from the original (faulted) write command to the transmission layer 112. In some embodiments, the command layer 111 may pass the second write command as an interrupt to the transmission layer 112; ensuring that the data is transmitted to the target device before subsequently ordered commands are transmitted. In other embodiments, the command layer 111 may delay passing subsequently ordered commands to the transmission layer 112 until the second write command is completely (and successfully) transmitted to the target device. The command layer 111 or the transmission layer 112 may specify that the second write command is to be sent over a different path than the path for which a transmission fault was detected (per block 440). The transmission layer 112 may then encode the second write command onto the different path for completion at the target device. Method 400 may then conclude and proceed to send additional or subsequent commands to the target device.

At block 470, the command layer 111 generates a LUN reset command. The LUN reset command specifies which LU 121 of the target device is to be reset, and prevents the target device from completing the write command that was determined to have been completely transmitted to the target device (per block 450).

At block 480, the command layer 111 sends the LUN reset command to the transmission layer 112. The command layer 111 may specify which path of the multiple input/output environment the transmission layer 112 is to use when transmitting the LUN reset command to the target device.

At block 490, the transmission layer 112 encodes the LUN reset command onto the physical transmission medium to transmit the LUN reset command to the target device. The transmission layer 112 transmits the LUN reset command via a different path than the path originally used to transmit the write command. Method 400 may then proceed to block 460, where the write command cleared from the target device by the LUN reset command may be resent, and additional or sequential command may then be transmitted.

Figure 5:
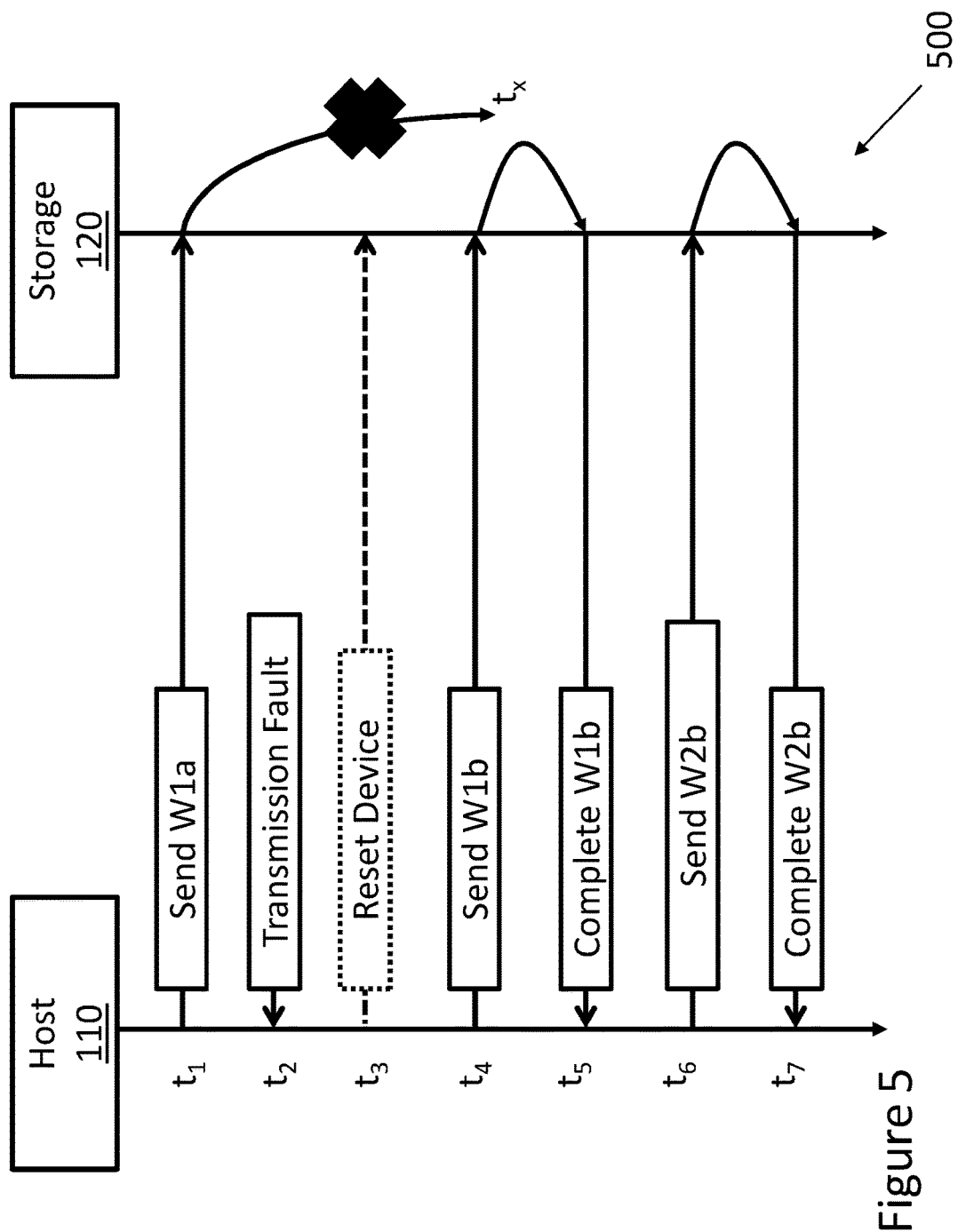
FIG. 5 is an example timing chart for handling a transmission fault affecting a command in a multiple path input/output environment.

FIG. 5 is an example timing chart for handling a transmission fault affecting a command in a multiple path input/output environment. The timing chart 500 shows a timeline for each of a host 110 and a storage 120 from an initial time $t_1$ extending to a time $t_7$ for an example implementation of a method for protecting data integrity in a multiple path input/output environment. Although illustrated with evenly spaced time intervals, the timing chart 500 shall be understood to encompass embodiments with uneven time intervals. Additionally, although shown with a given number of events, other events may occur that are not illustrated on the timing chart 500, so as not to distract from the teachings of the present disclosure.

At time $t_1$, the host 110 transmits a first write command over $path_a$ to the storage 120 (termed command "W1a").

The host 110 expects to receive a response from the storage 120 at a later time to indicate that the storage 120 has successfully completed command W1a, but at intervening time $t_2$, the host 110 detects that an error has occurred on $path_a$. The transmission fault may be detected in a variety of ways described herein, and prevents the host 110 from receiving an expected response at a later time.

If the host 110 does not receive an expected response for command W1a, host 110 may re-transmit the command to write the data included in command W1a over a different path (e.g., $path_b$ as command W1b) at time $t_4$. Once the host 110 receives a completed response from the storage 120 at time $t_5$, the host 110 may proceed with transmitting additional commands and act on the responses from the storage 120, such as by transmitting a second command W2b at time $t_6$ and receiving the associated completion response at time $t_7$.

If the transmission fault at time $t_2$ occurs before W1a is fully transmitted from the host 110 to the storage 120, the storage 120 may delete or ignore command W1a and commands W1b and W2b may be completed without affecting the data integrity of the storage 120 (and without further input from the host 110). However, if the transmission fault at time $t_2$ occurs after W1a is fully transmitted from the host 110 to the storage 120, the storage 120 may complete command W1a at an indeterminate time $t_x$ after time $t_1$. If the storage 120 completes command W1a at time $t_x$, and the host 110 is not notified of the completion of command W1a, any subsequent write commands, such as W1b and W2b sent at times $t_4$ and $t_6$, may affect the data integrity of the storage 120. For example, the originally transmitted command W1a may be completed by the storage 120 at an unknown time $t_x$, which may result in the data in command W1a/W1b being written to the storage 120 more than once, and/or data being overwritten in the storage 120.

To protect the data integrity of the storage 120, once the host 110 detects the transmission fault at time $t_2$, the host 110 determines whether the command W1a was fully transmitted before time t2 when the transmission fault is detected. If it is determined that the command W1a was not fully transmitted at time t2, the host 110 may allow the storage 120 to ignore/delete the partially transmitted command W1a without further input from the host 110, and proceed in transmitting data to the storage 120 over a different path than the faulted $path_a$. If it is determined that the command W1a was fully transmitted at time $t_2$, the host 110 generates and transmits a LUN reset command over a different path than $path_a$ (i.e., $path_n$) to the storage 120. The host 110 determines (via the command layer 111) whether to generate the LUN reset at time $t_3$ based on whether a write command is believed to be outstanding (i.e., the execution status of the write command is unknown) at a time that a transmission fault is detected (e.g., by the transmission layer 112).

In the current timing chart 500, command W1a is believed to be outstanding because a completion response for command W1a has not be received prior to time $t_2$ when the host 110 has detected a transmission fault. The LUN reset clears the commands queued for execution on the LU 121 that was addressed by command W1a so that command W1a does not complete out of sequence or potentially overwrite any data written according to subsequent commands. The LUN reset ensures that the command W1a is either completed or flushed from the storage 120 prior to proceeding with commands that the host 110 intended to execute after command W1a.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   passing a write command that includes data to be written to a target device from a command layer within an initiator device to a transmission layer within the initiator device;
   specifying, via the transmission layer, the write command to be sent over a first path of a plurality of paths by which the target device is in communication with the initiator device as a physical transport layer between the target device and the initiator device;
   sending, via the transmission layer, the write command over the first path from the initiator device to the target device;
   detecting a fault in the first path;
   notifying, by the transmission layer, the command layer of the fault in the first path;
   in response to detecting the fault in the first path:
   determining a status of the write command indicating whether the write command was fully transmitted by the transmission layer before the fault was detected;
   in response to determining the status of the write command as fully transmitted before the fault was detected:
     passing a reset command for the target device from the command layer to the transmission layer;
     selecting, via the command layer, a second path of a plurality of paths other than the first path;
     sending, via the transmission layer, the reset command over the second path from the initiator device to the target device;
     passing a second write command that includes the data to be written to the target device from the command layer to the transmission layer;

selecting, via the command layer, a different path of a plurality of paths other than the first path; and sending, via the transmission layer, the second write command over the different path from the initiator device to the target device.

2. The method of claim 1, further comprising:

in response to determining the status of the write command as not fully transmitted:

passing a re-transmittal write command that includes the data to be written to the target device from the command layer to the transmission layer;

selecting, via the command layer, a new path of a plurality of paths other than the first path; and sending, via the transmission layer, the re-transmittal write command over the new path from the initiator device to the target device.

3. The method of claim 1, wherein the fault in the first path is detected in response to the command layer waiting for a time longer than a predetermined time window to receive a completion response for the write command.

4. The method of claim 1, wherein the fault in the first path is detected in response to the transmission layer detecting that connectivity with the target device over the first path is lost.

5. The method of claim 1, wherein the fault includes one of a connection fault, an improperly generated command, an improperly read command, and interference generated on a switch linking the initiator device and the target device.

6. The method of claim 1, wherein the write command includes commands to write specified data to the target device, to erase specified data from the target device, and to copy specified data on the target device to a new address on the target device.

7. A system for protecting data integrity in a multiple path input/output environment is provided, the system comprising: a processor and a memory storage device including instructions that when executed by the processor enable the system to:

pass a write command that includes data to be written to a target device from a command layer within an initiator device to a transmission layer within the initiator device;

specify, via the transmission layer, the write command to be sent over a first path of a plurality of paths by which the target device is in communication with the initiator device as a physical transport layer between the target device and the initiator device;

send, via the transmission layer, the write command over the first path from the initiator device to the target device;

detect a fault in the first path;

notify, by the transmission layer, the command layer of the fault in the first path;

in response to detecting the fault in the first path:

determine a status of the write command indicating whether the write command was fully transmitted by the transmission layer before the fault was detected;

in response to determining the status of the write command as fully transmitted before the fault was detected:

pass a reset command for the target device from the command layer to the transmission layer;

select, via the command layer, a second path of a plurality of paths for the reset command to be sent over;

send, via the transmission layer, the reset command over the second path from the initiator device to the target device;

pass a second write command that includes the data to be written to the target device from the command layer to the transmission layer;

specify, via the transmission layer, the second write command to be sent over a different path of a plurality of paths than the first path; and send, via the transmission layer, the second write command over the different path from the initiator device to the target device.

8. The system of claim 7, further operable to:

in response to determining the status of the write command as not fully transmitted:

pass a re-transmittal write command that includes the data to be written to the target device from the command layer to the transmission layer;

select, via the command layer, a new path of a plurality of paths than the first path for the reset command to be sent over; and send, via the transmission layer, the re-transmittal write command over the new path from the initiator device to the target device.

9. The system of claim 7, wherein the fault in the first path is detected in response to the command layer waiting for a longer time than a predetermined time window to receive a completion response for the write command.

10. The system of claim 7, wherein the fault in the first path is detected in response to the transmission layer detecting that connectivity with the target device over the first path is lost.

11. The system of claim 7, wherein the fault includes one of a connection fault, an improperly generated command, an improperly read command, and interference generated on a switch linking the initiator device and the target device.

12. The system of claim 7, wherein the write command includes commands to write specified data to the target device, to erase specified data from the target device, and to copy specified data on the target device to a new address on the target device.

13. A computer program product for protecting data integrity in a multi-path input/output environment, the computer program product comprising:

a computer-readable storage medium having computer-readable program code embodied therewith, the computer-readable program code executable by one or more computer processors to:

generate a write command that includes data to be written to a target device from an initiator device;

specify a first path of a plurality of paths by which the target device is in communication with the initiator device;

send the write command over the first path from the initiator device to the target device;

detect a fault in the first path;

in response to detecting the fault in the first path and identifying a status of the write command as fully transmitted before the fault was detected:

select a second path of a plurality of paths by which the target device is in communication with the initiator device;

send a reset command over the second path from the initiator device to the target device; and after sending the reset command, send a second write command that includes the data over the second path from the initiator device to the target device.

14. The computer program product of claim 13, further enabled to:

in response to detecting the fault in the first path and identifying the status of the write command as not fully transmitted:

select a different path of a plurality of paths than the first path by which the target device is in communication with the initiator device; and send a re-transmittal write command that includes the data over the different path from the initiator device to the target device.

15. The computer program product of claim 13, wherein the fault in the first path is detected in response to the initiator device waiting for longer than a predetermined time window to receive a completion response from the target device for the write command.

16. The computer program product of claim 13, wherein the fault in the first path is detected in response to detecting that connectivity between the initiator device and the target device over the first path is lost.

17. The computer program product of claim 13, wherein the fault includes one of a connection fault, an improperly generated command, an improperly read command, and interference generated on a switch linking the initiator device and the target device.

\* \* \* \* \*